United States Patent
Hammarlund et al.

(10) Patent No.: US 11,513,848 B2
(45) Date of Patent: Nov. 29, 2022

(54) CRITICAL AGENT IDENTIFICATION TO MODIFY BANDWIDTH ALLOCATION IN A VIRTUAL CHANNEL

(71) Applicant: Apple Inc., Cupertino, CA (US)

(72) Inventors: Per H. Hammarlund, Sunnyvale, CA (US); Liran Fishel, Raanana (IL); Roman Gindin, Hod Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/220,703

(22) Filed: Apr. 1, 2021

(65) Prior Publication Data

US 2022/0107836 A1    Apr. 7, 2022

Related U.S. Application Data

(60) Provisional application No. 63/087,442, filed on Oct. 5, 2020.

(51) Int. Cl.
    *G06F 9/48*   (2006.01)
    *G06F 13/40*  (2006.01)

(52) U.S. Cl.
    CPC ........ *G06F 9/4881* (2013.01); *G06F 13/4027* (2013.01)

(58) Field of Classification Search
    CPC ............................ G06F 9/4881; G06F 13/4027
    See application file for complete search history.

(56) References Cited

U.S. PATENT DOCUMENTS

| | | | |
|---|---|---|---|
| 8,619,793 B2 * | 12/2013 | Lavian | H04L 47/2458 370/522 |
| 9,262,348 B2 | 2/2016 | Gandhi et al. | |
| 9,264,368 B2 | 2/2016 | Swarbriek et al. | |
| 10,481,944 B2 * | 11/2019 | Arbel | G06F 3/064 |
| 10,838,908 B2 | 11/2020 | Swarbriek et al. | |
| 10,972,396 B2 * | 4/2021 | Ayandeh | H04L 47/2441 |
| 2003/0063562 A1 * | 4/2003 | Sarkinen | H04L 47/2433 370/252 |
| 2003/0115380 A1 * | 6/2003 | Ajanovic | G06F 13/4252 710/1 |
| 2010/0128605 A1 * | 5/2010 | Chavan | H04L 47/11 370/230.1 |
| 2012/0250507 A1 * | 10/2012 | Neeser | H04L 47/12 370/234 |
| 2016/0259973 A1 * | 9/2016 | Amtrup | G06V 30/142 |
| 2018/0189097 A1 * | 7/2018 | Bruce | G06F 9/466 |
| 2020/0081622 A1 | 3/2020 | Mathews et al. | |

\* cited by examiner

*Primary Examiner* — Henry Tsai
*Assistant Examiner* — Christopher A Daley
(74) *Attorney, Agent, or Firm* — Kowert, Hood, Munyon, Rankin & Goetzel, P.C.; Lawrence J. Merkel

(57) ABSTRACT

In an embodiment, a system includes rate limiter circuits corresponding to various agents that issue transactions in a virtual channel. At least one agent may be identified as a critical agent, and different rate limits (e.g., lower limits) may be selected for other agents when the critical agent is on than when the critical agent is off (e.g., higher limits).

20 Claims, 5 Drawing Sheets

Computer Accessible Storage Medium 800

SOC
804

FIG. 6

CRITICAL AGENT IDENTIFICATION TO MODIFY BANDWIDTH ALLOCATION IN A VIRTUAL CHANNEL

This application claims benefit of priority to U.S. Provisional Patent Application Ser. No. 63/087,442, filed on Oct. 5, 2020. The above application is incorporated herein by reference in its entirety. To the extent anything in the incorporate material conflicts with material expressly set forth herein, the material expressly set forth herein controls.

BACKGROUND

Technical Field

Embodiments described herein are related to digital systems and, more particularly, to controlling bandwidth allocation among multiple agents to a virtual channel on an interface in a digital system.

Description of the Related Art

Digital systems of various sorts include one or more integrated circuits connected together to implement the desired operation of the system. The interconnect between the integrated circuits, and on-chip interconnect between various sub-blocks within an integrated circuit, supports communication between and within the circuits to allow the integrated circuits and sub-blocks to perform the desired processing.

Often, an interconnect is shared by one or more initiators of transactions on the interconnect. The initiators (whether integrated circuits on an inter-integrated circuit interconnect or sub-blocks in an integrated circuit for an intra-integrated circuit interconnect) are referred to as "agents." Responders on the interconnect can also be referred to as agents. Multiple communications over the interconnect can occur to complete a transaction (e.g., a request from an initiating agent, a response from the responding agent, various coherency communications for cache coherent networks, etc.). The interconnect can have a variety of topologies and protocols (e.g., shared buses, point to point connections between agents, mesh networks, etc., and combinations thereof).

The shared interconnect can become a bottleneck for communications, and various agents may be prevented from achieving high bandwidth and/or low latency completion of transactions when the traffic on the shared interconnect is high. One mechanism to improve the sharing of the interconnect is virtual channels. Multiple virtual channels can use the same physical channel (the interconnect) to communicate, but are logically independent. That is, a lack of resources to transmit a communication in one virtual channel (e.g., a location in a buffer at receiving agent or intermediate circuit on the interconnect) does not prevent a communication in another virtual channel from being transmitted. Coupled with arbitration schemes at various points in the interconnect that treat different virtual channels differently (e.g., one channel may be given higher priority than another), high bandwidth and/or low latency may be achieved on a channel even when there is significant traffic on the interconnect. However, traffic within a given virtual channel can still cause issues for an agent that uses that virtual channel. For example, too much traffic from less critical agents (in terms of functionality in the system) can cause a more critical agent to exceed latency or bandwidth targets for the more critical agent.

BRIEF DESCRIPTION OF THE DRAWINGS

The following detailed description refers to the accompanying drawings, which are now briefly described.

FIG. 6 is a block diagram of one embodiment of a computer accessible storage medium.

Figure 1:
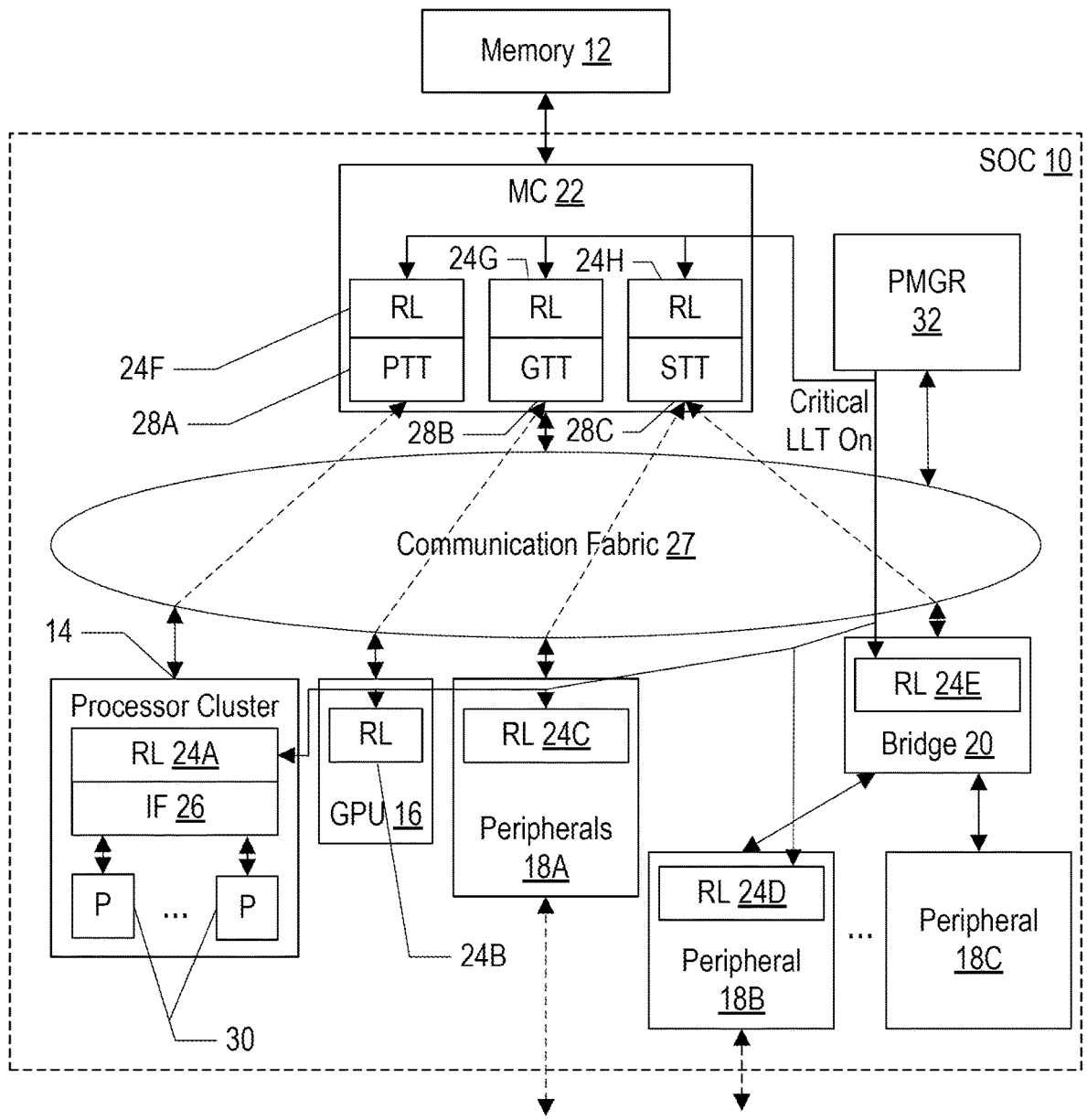
FIG. 1 is a block diagram of one embodiment of a system on a chip (SOC).

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In an embodiment, a system uses multiple virtual channels to transmit traffic between agents over an interconnect (e.g., a communication fabric). For example, the virtual channels may include a bulk virtual channel and a low latency (LLT) virtual channel. The LLT virtual channel may be used for latency-sensitive reads and writes to memory, and may generally be given a certain amount of priority over the bulk virtual channel in arbitration. The bulk virtual channel may be used for less latency-sensitive reads and writes. While the LLT channel is favored over the bulk channel for arbitration to help reduce the latency, but there may be no guarantee of a particular latency. For isochronous traffic like audio, the lack of maximum latency may not be sufficient (e.g., if the latency requirement is not met, there will be user-visible error whereas other LLT agents like the CPUs can have higher latency and it will impact performance but not functionality). Isochronous data may be data that is provided at a regular rate over time. That is, the data is transmitted at substantially fixed intervals in real time, and variation from the interval may cause underrun or overrun of the data. For audio data, for example, underruns may result in audible skipping in the sounds (or dropouts), and overruns may result in lost sound.

In an embodiment, traffic in the LLT virtual channel may be rate-limited, dividing the available bandwidth in the LLT virtual channel among the transaction sources that generate LLT traffic. In particular, requesting agents that may issue LLT transactions may include a rate limiter circuit which may control a rate at which the requesting agent may transmit LLT transactions. If the requesting agent issues enough LLT transactions to reach the limit set by the rate limiter circuit, the requesting agent may be prevented from issuing more LLT transactions for a period of time. In an embodiment, the rate limiter circuits may implement a "leaky bucket" mechanism in which credits for transmitting LLT transactions are refilled periodically into the bucket, and the credits are consumed from the bucket as transactions are issued. If the bucket becomes empty (no credits remain), the rate limiter circuit may prevent issuance of additional LLT transactions until sufficient credits have accumulated via the periodic refill mechanism. It is noted that the credits for the rate limiter circuits are different from credits that are often used in communication fabrics to ensure that resources are available at a receiving agent or intermediate circuit to handle a given transaction. A transaction request may need to have an appropriate number of the fabric resource credits to be issued by a requesting agent, as may other communications involved in the transaction.

One or more of the requesting agents may be identified as "critical" agents for which a maximum memory latency is needed to ensure correct functional operation. For example, the aforementioned requesting agents for which the data transmission is isochronous (or has an isochronous property) may be critical agents. Other agents with various real time requirements may be identified as critical agents. Generally, any agent may be identified as a critical agent. The critical agents may not include the rate limiter circuits (or may have their rate limiter circuits disabled) in an embodiment.

In some cases, the amount of available bandwidth in the memory system, when divided up over of the various agents that generate/issue LLT transactions, may not provide enough bandwidth to ensure that the critical agents' maximum latency can be met. While bandwidth and latency are not precisely the same attributes, a high bandwidth-consuming agent may cause an increase in latency by rapidly issuing numerous transaction requests before a more latency-sensitive agent is able to issue transaction requests. These high-bandwidth transaction requests in the same virtual channel ahead of the more latency-sensitive requests may increase the latency to complete the more sensitive requests (e.g., if the requests remain in order throughout their lifetime to completion).

To better support the latency requirements of one or more critical agents, multiple rate limits may be supported by the rate limiting circuits. If one or more critical agents are powered on (and thus might issue LLT transactions), the rate limiting circuits may operate in a lower limit state, permitting more bandwidth to be available to the critical agents. When more than one critical agent is identified in a system, more than one lower limit may be supported, and the selected limit may be based on the number of critical agents that are powered on. In an embodiment, the system may support only one critical agent and thus there may be one lower limit state (a "low limit" state). Additionally, a high limit state may be supported when the critical agent or agents are powered off. More bandwidth may be consumed by non-critical agents in the high limit state. The system with one critical agent will be used as an example herein, but generally more than one critical agent may be supported with selection of lower limits based on how many and/or which critical agents are powered on.

In an embodiment, there may be one or more intermediate rate limiter circuits between the various agents and the target of the transactions (e.g., a memory controller). In such an embodiment, intermediate rate limiter circuits between a critical agent and the target may use higher limits when the critical agent is on (or keep limits steady, not reducing the limits). Other intermediate circuits (e.g., those intermediate circuits that are not between a critical agent and the target of the transactions) may use lower limits when a critical agent is on. In other embodiments, intermediate circuits may not include rate limiter circuits and instead may rely on the rate limiter circuits of the requesting agents to control overall bandwidth consumption.

Each credit may correspond to a particular amount of data being transmitted (e.g., a cache block, or a portion of a cache block). For example, a cache block may be 128 bytes, and each credit may represent 32 bytes. In this example, 4 credits would be consumed by a complete cache block read or write. Reads or writes of smaller amounts of data would consume credits based on how many bytes are transmitted (within the granularity of a rate limiter credit).

In an embodiment, the memory controlled by the memory controller may be configured to operate at a variety of frequencies, or speeds. Thus, the available bandwidth in the memory may be a function of the current frequency. The credit refill rate may be adjusted or scaled based on the current frequency so that the bandwidth allocated to each requesting agent is a function of the available bandwidth. The high and low limits mentioned above may also be adjusted or scaled based on the memory frequency as well.

Accordingly, in an embodiment, a system is disclosed comprising a plurality of agents and a communication fabric coupled to the plurality of agents. The plurality of agents are configured to communicate on the communication fabric using one or more virtual channels. A subset of the plurality of agents include rate limiter circuits that control transmission of communications by the subset of the plurality of agents in a first virtual channel of the one or more virtual channels. The rate limiter circuits are programmable to specify a rate of transmission on the first virtual channel for corresponding agents of the subset. The rate limiter circuits are configured to modify the rate of transmission permitted by the rate limiter circuits based on an indication of whether or not at least a first agent of the plurality of agents is powered on. The first agent uses the first virtual channel.

In FIG. 1, a block diagram of one embodiment of a system on a chip (SOC) 10 is shown. While an SOC embodiment is used as an example here, systems comprising multiple integrated circuits coupled to a communication fabric may be used in other embodiments. In FIG. 1, the SOC 10 is coupled to a memory 12. As implied by the name, the components of the SOC 10 may be integrated onto a single semiconductor substrate as an integrated circuit "chip." In the illustrated embodiment, the components of the SOC 10 include at least one processor cluster 14, at least one graphics processing unit (GPU) 16, one or more peripheral components such as peripheral components 18A-18C (more briefly, "peripherals"), a bridge circuit 20 (more briefly "bridge" 20), a memory controller 22, a power manager circuit (PMGR) 32, and a communication fabric 27. The components 14, 16, 18A, 20, 22, and 32 may all be coupled to the communication fabric 27. The components 18B and 18C may be coupled to the communication fabric 27 through the bridge 20. The memory controller 22 may be coupled to the memory 12 during use. In some embodiments, there may be more than one memory controller coupled to a corresponding memory. The memory address space may be mapped across the memory controllers in any desired fashion in such embodiments. In the illustrated embodiment, the processor cluster 14 may include a plurality of processors (P) 30. The processors 30 may form the central processing units (CPU(s)) of the SOC 10.

The processor cluster 14, the GPU 16, the peripherals 18A-18B, the bridge 20, and the memory controller 22 may include various rate limiter circuits 24A-24H as shown in FIG. 1. Thus, the components 14, 16, 18A-18B, and 20 may be agents that may issue transactions in the LLT virtual channel. There may be agents in various embodiments that do not issue transactions in the LLT virtual channel, and such agents may not require rate limiter circuits (or may include rate limiting for other virtual channels, if desired). The peripheral 18C may also be configured to issue transactions in the LLT virtual channel but may be identified as a critical agent and thus may not have a rate limiter circuit. In other embodiments, critical agents may include rate limiter circuits, but the circuits may not be enabled. In still other embodiments, critical agents may include rate limiter circuits, but the rate limits may be programmed high enough that the critical agents may meet their latency requirements when other rate limiter circuits are modifying their rate limits as discussed previously. In yet another embodiment, a given critical agent may have multiple modes, and the agent may not be critical in one more of the modes. The rate limiter may be enabled in non-critical modes and not enabled in critical modes (or may be enabled in critical modes as well, but programmed with higher rate limits as mentioned above). Thus, various embodiments may include or not include a rate limiter circuit, and/or enable or not enable the rater limiter circuit, as desired.

The rate limiter circuit 24A in the processor cluster 14 may be coupled to an interface circuit 26 that may be coupled to the processors 30. The interface circuit 26 may be configured to issue transactions generated by the processors 30 on the communication fabric 27. The interface circuit 26 may include a last level cache, in some embodiments. There may be similar interface circuits in other agents 16, 18A-18B, and 20 which may couple to the rate limiter circuits 24B-24E, not shown in FIG. 1.

The PMGR 32 may be configured to control power states in the SOC 10, including which components are powered up or powered down. In the illustrated embodiment, the PMGR 32 may be configured to provide an indication of whether or not critical agents are powered up ("Critical LLT on" signal in FIG. 1, for example). The indication may be provided to the rate limiter circuits 24A-24H so that the rate limiter circuits 24A-24H may modify their rate limits. In this embodiment, there is one critical agent and thus the indication may be a signal indicating whether or not the critical agent is powered on. In other embodiments, there may be more than one critical agent and the critical LLT on indication may indicate how many of the critical agents are on (e.g., via a number, a mask indicating which critical agents are on, etc.). Different rate limit modifications may be supported, in some embodiments, depending on how many critical agents are on (e.g., one reduction when one critical agent is on, a larger reduction for two critical agents on, etc.). In other embodiments, the rate limit may be based on which particular critical agent(s) are on (e.g., some critical agents may have higher rate limiting than others, based on respective latency requirements).

Most rate limiter circuits 24A-24G may reduce their rate limits when a critical agent is on, and increase their rate limits when the critical agent is off. For example, the rate limiters 24A-24D and 24F-24G may reduce their rate limits in the embodiment of FIG. 1. However, some rate limiter circuits may increase their limits or hold their limits constant. For example, the bridge 20 may be provided to bridge from the peripherals 18B-18C to the communication fabric 20 in an embodiment. Since the peripheral 18C is the critical agent in this embodiment, the rate limit may increase in the bridge 20 when the critical agent is on. Similarly, the rate limiter circuit 24H may be associated with transactions in the memory controller 22 that are initiated by the peripheral 18C, and thus the rate limiter circuit 24H may increase its rate limits (or keep the rate limits constant, not reducing the limits) when the critical LLT on signal is asserted.

As mentioned above, the bridge 20 may bridge communications between the peripherals 18B-18C and the communication fabric 27. For example, the peripherals 18B-18C may be designed to communicate using a different interconnect than the communication fabric 27, and the bridge 20 may be configured to generate communications as defined on the communication fabric 27 to complete communications from the peripherals 18B-18C. When communications are received on the communication fabric 27 directed to the peripherals 18B-18C, the bridge 20 may generate corresponding communications on the interconnect to the peripherals 18B-18C. In other embodiments, the peripherals 18B-18C may implement the interface and protocol specified by the communication fabric 27, but the bridge 20 may be a gathering point for the transactions from the peripherals 18B-18C. For example, the peripherals 18B-18C may be relatively low bandwidth peripherals and concentrating the traffic via a bridge 20 may reduce the number of inputs to the communication fabric 27.

The memory controller 22 may include transaction tables 28A-28C configured to receive transactions issued from various sources in the SOC 10 and configured to track the progress of the transactions in the memory controller 22 and/or to completion. There may also be various queues to receive the transactions and store the transactions until the transactions are selected to begin processing in the memory controller 22. The sources assigned to each transaction table 28A-28C are illustrated by dotted lines in FIG. 1. Thus, the processor transaction table (PTT) 28A may receive the transactions initiated by the processors 30; the graphics transaction table (GTT) 28B may receive the transactions initiated by the GPU 16, and the SOC transaction table (STT) 28C may receive the transactions issued by other components in the SOC 10, such as the peripherals 18A-18C (with transactions from the peripherals 18B-18C arriving through the bridge 20). Since the peripheral 18C has transactions in the STT 28C, the rate limiter circuit 24H may increase its limit when critical LLT on is indicated. The other rate limiter circuits 24F-24G may be configured to reduce their limits when critical LLT on is indicated, since they are not receiving transactions from a critical LLT agent.

The PMGR 32 may be configured to control the supply voltage magnitudes requested from an external power management unit (PMU). There may be multiple supply voltages generated by the PMU for the SOC 10. For example, there may be a supply voltage for the processor cluster 14 and at least one supply voltage for the rest of the SOC 10 outside of the processor cluster 14. In an embodiment, the same supply voltage may serve components of the SOC 10 outside of the processor cluster 14 and power gating may be employed based to control one or more independent power domains served by the power supply voltage. There may be multiple supply voltages for the rest of the SOC 10, in some embodiments. In some embodiments, there may also be a memory supply voltage for various memory arrays in the processor cluster 14 and/or the SOC 10. The memory supply voltage may be used with the voltage supplied to the logic circuitry, which may have a lower voltage magnitude than that required to ensure robust memory operation. The PMGR 32 may be under direct software control (e.g., software may directly request the power up and/or power down of components) and/or may be configured to monitor the SOC 10 and determine when various components are to be powered up or powered down. Various power states within a component (e.g., power states of the processors 30) may be controlled via the PMGR 32, as well as the sequencing of changes to power states, different request voltage and frequencies, etc.

As mentioned above, the processor cluster 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18A-18C (collectively, peripherals 18) may be any set of additional hardware functionality included in the SOC 10. For example, the peripherals 18 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The interconnection to external device is illustrated by the dashed arrow in FIG. 1 that extends external to the SOC 10. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as the processors 30 in each processor cluster 14 may vary from embodiment to embodiment. Additionally, the number of processors 30 in one processor cluster 14 may differ from the number of processors 30 in another processor cluster 14 when multiple processor clusters are included. There may be more or fewer of each component/subcomponent than the number shown in FIG. 1.

Figure 2:
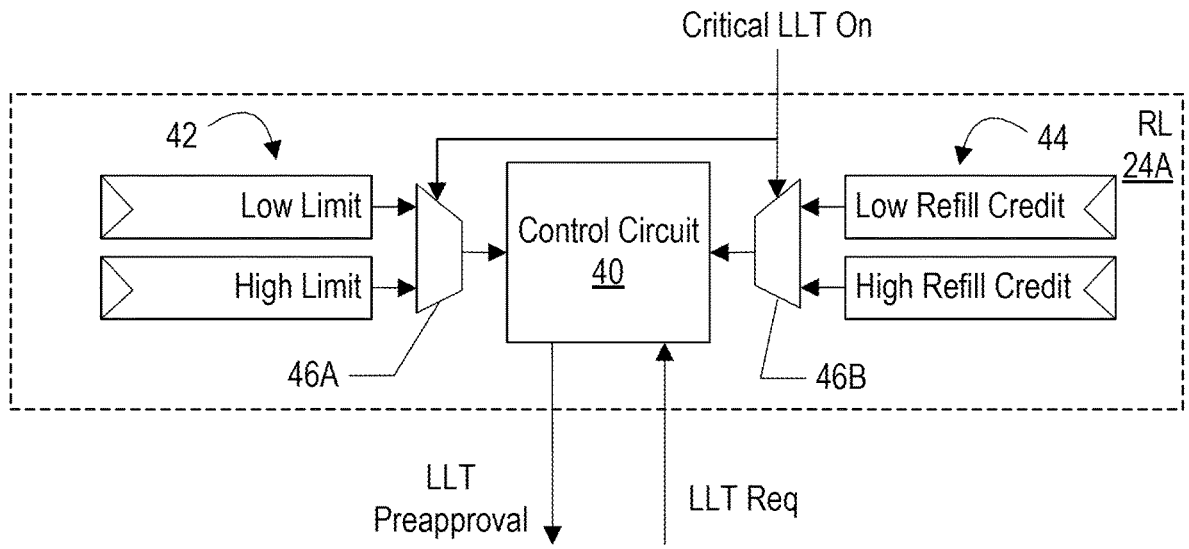
FIG. 2 is a block diagram of one embodiment of rate limiter.

Turning now to FIG. 2, a block diagram of one embodiment of the rate limiter circuit 24A is shown. Other rate limiter circuits 24B-24G may be similar. In the illustrated embodiment, the rate limiter circuit 24A includes a control circuit 40, rate parameter registers 42 and 44, and multiplexors (muxes) 46A and 46B. The rate parameter registers 42 are coupled to the inputs to mux 46A, and the rate parameter registers 44 are coupled to the inputs to mux 46B. The control circuit 40 is coupled the outputs of the muxes 46A-46B, and to an LLT request input and to LLT grant/preapproval outputs. The critical LLT on indication is provided as a selection control to the muxes 46A-46B.

The control circuit 40 may implement the rate limiting operation based on the rate parameters from the parameter registers 42 and 44. For example, in one embodiment, the control circuit 40 may implement a leaky bucket mechanism for credits related to rate limiting. In a leaky bucket mechanism, a number of credits may be provided to the bucket at a relatively fixed rate, and credits are consumed from the bucket as transactions are transmitted. If there are no credits available in the bucket, transactions may not be permitted. In one embodiment, the consumed credits may be added to a counter representing the bucket, and refill credits may be subtracted from the counter (e.g., the counter may be part of the control circuit 40). In this embodiment, a counter of zero may represent a full bucket and a counter equal to the limit may indicate an empty bucket (no transactions to be sent). In another embodiment, refill credits may be added from the counter and consumed credits may be subtracted from the counter. A counter equal to zero may indicate an empty bucket and a counter value equal to the limit may indicate a full bucket.

The parameters registers 42 may be programmed with a low limit and a high limit, in one embodiment. The low limit may be the bandwidth limit if the critical LLT on indication is active (or asserted). The high limit may be the bandwidth limit if the critical LLT on indication is inactive (or deasserted). Thus, the mux 46A may select the low limit if the critical LLT on indication is active and the high limit if the critical LLT on indication is inactive. Similarly, the parameter registers 44 may be programmed with a low refill credit and a high refill credit. The mux 46B may select the low refill credit if the critical LLT on indication is active and the high refill credit if the critical LLT on indication is inactive.

In other embodiments, the refill credits may be a function of time only and may not change based on the critical LLT on indication.

The above discussion is related to a rate limiter circuit that reduces its rate limit when the critical LLT on indication is active. For rate limiter circuits that increase their rate limits when the critical LLT on indication is active, the opposite selections of the muxes 46A-46B may be made (e.g., high limit selected if critical LLT on indication is active and low limit selected if critical LLT on indication is inactive).

In this embodiment, the rate limiter circuit 24A may operate on a preapproval/request basis. That is, as long as the limit has not been reached in consuming credits in the bucket, the LLT preapproval output may be asserted, indicating that LLT requests may be sent. Once the limit is reached, the preapproval output may be deasserted and requests may not be sent until refill credits are provided. The LLT request input may indicate that a request is being sent, and a number of credits consumed by the request (e.g., the credits may be based on the size of the request, such as the number of bytes transmitted).

It is noted that, in other embodiments, there may be more than one critical LLT agent. In such embodiments, there may be more than two limits and/or more refill credits and selection among the limits/credits may be based on the number of critical LLT agents that are on. It is further noted that the memory 12 may be configured to operate at one of various frequencies during operation, and may dynamically change the frequencies during operation. The parameters registers 42 and 44 may include high and low parameters corresponding to each frequency, and selected high and low parameters may be determined based on the current frequency. The selected high or low parameter to be applied may be determined based on the critical LLT on indication as discussed above.

Figure 3:
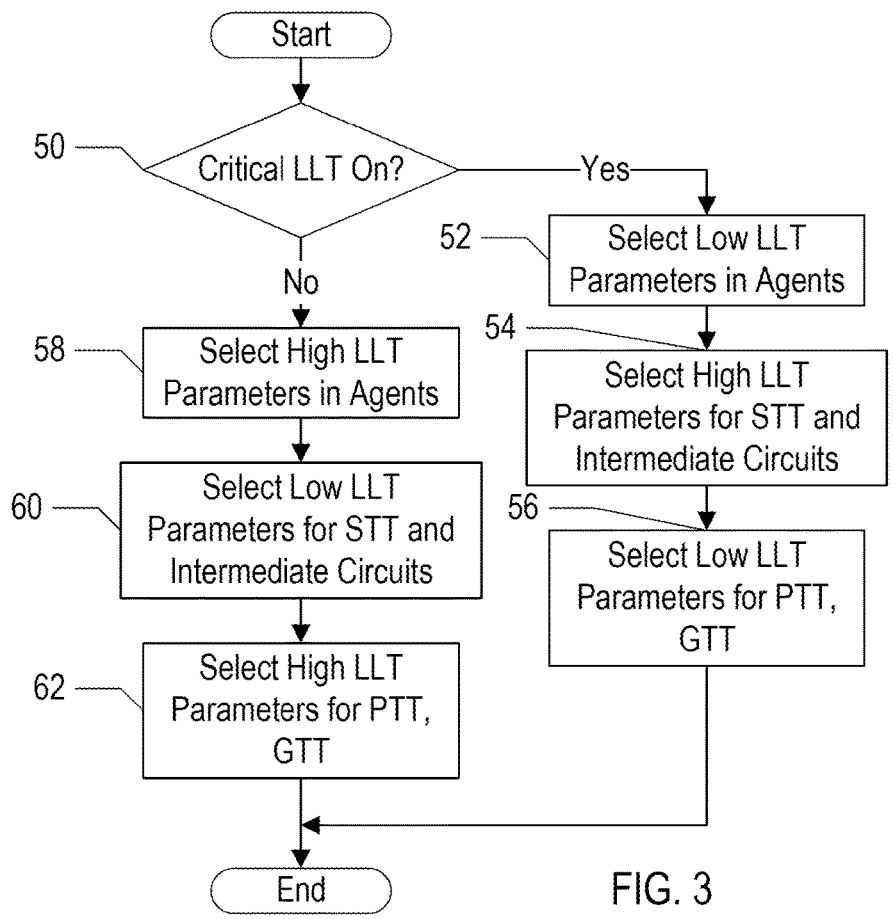
FIG. 3 is a flowchart illustrating certain operations of one embodiment of the rate limiters shown in FIGS. 1 and 2.

FIG. 3 is a flowchart illustrating one embodiment of rate limiter circuits 24A-24G for one embodiment based on the critical LLT on indication. While the blocks are shown in a particular order for ease of illustration, other orders may be used. Blocks may be performed in parallel in combinatorial logic in the rate limiter circuits 24A-24G/control circuit 40. Blocks, combinations of blocks, and/or the flowchart as a whole may be pipelined over multiple clock cycles. The rate limiter circuits 24A-24G/control circuit 40 may be configured to implement the operation shown in FIG. 3.

If the critical LLT on indication is asserted (decision block 50, "yes" leg), the rate limiter circuits 24A-24D and 24F-24G in the agents may select the low LLT parameters, such as the low limit and/or the low refill credits for the embodiment of FIG. 2 (block 52). The rate limiter circuit 24H for the STT 28C may select the high LLT parameters, such as the high limit and/or the high refill credits for the embodiment of FIG. 2 (block 54). Similarly, rate limiter circuits in intermediate circuits between the critical LLT agent(s) and the memory controller 22 (e.g., the rate limiter circuit 24E in the bridge 20 in FIG. 1) may select the high LLT parameters. The rate limiter circuits 24F-24G for the PTT 28A and the GTT 28B may select the low LLT parameters (block 56).

On the other hand, if the critical LLT on indication is deasserted (decision block 50, "no" leg), the rate limiter circuits 24A-24D and 24F-24G in the agents may select the high LLT parameters (block 58). The rate limiter circuit 24H for the STT 28C may select the low LLT parameters (block 60). Similarly, rate limiter circuits in intermediate circuits between the critical LLT agent(s) and the memory controller 22 (e.g., the bridge 20 in FIG. 1) may select the low LLT parameters. The rate limiter circuits 24F-24G for the PTT 28A and the GTT 28B may select the high LLT parameters (block 62).

In another embodiment, multiple leaky buckets may be maintained using the various parameters. The buckets may be refilled with the refill credits periodically and may consume credits as transaction are issued. Each bucket may determine the LLT preapproval output based on the respective limits. The LLT preapproval output from one of the buckets may be selected based on the critical LLT on indication.

Figure 4:
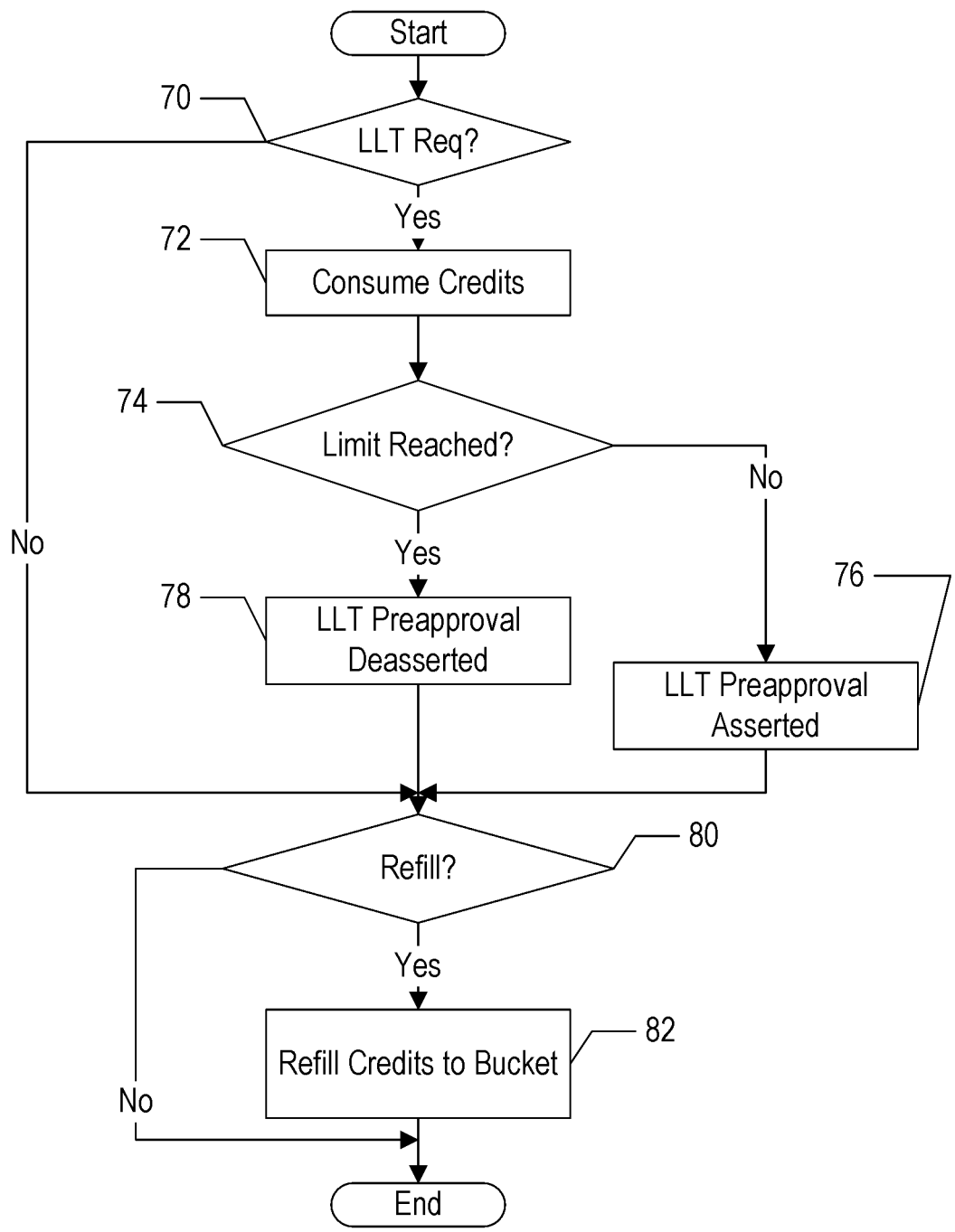
FIG. 4 is a flowchart illustrating certain other operations of one embodiment of the rate limiters shown in FIGS. 1 and 2.

FIG. 4 is a flowchart illustrating one embodiment of rate limiter circuits 24A-24G for one embodiment to grant requests and refill credits. While the blocks are shown in a particular order for ease of illustration, other orders may be used. Blocks may be performed in parallel in combinatorial logic in the rate limiter circuits 24A-24G/control circuit 40. Blocks, combinations of blocks, and/or the flowchart as a whole may be pipelined over multiple clock cycles. The rate limiter circuits 24A-24G/control circuit 40 may be configured to implement the operation shown in FIG. 4.

If one or more LLT transactions are issued as indicated on the LLT request input (decision block 70, "yes" leg), the rate limiter circuit 24A-24G/control circuit 40 may consume credits from the bucket (block 72). The number of credits consumed may be based on the number of requests and the sizes of the requests. For example, in an embodiment, a credit may represent 64 bytes and each 64 bytes either fully or partially transferred by a transaction may consume one credit. That is, a transaction that transfers any number of bytes between 1 and 64 may consume one credit, a transaction that transfers any number of bytes between 65 and 128 may consume two credits, etc. Other embodiments may represent a different number of bytes with one credit. If the limit has been reached (decision block 74, "yes" leg), the rate limiter circuit 24A-24G/control circuit 40 may deassert the LLT preapproval output and additional transactions may be prevented from issuing until the credits are refilled (block 76). If the limit has not been reached (decision block 74, "no" leg), the rate limiter circuit 24A-24G/control circuit 40 may assert the LLT preapproval output may be asserted and additional LLT transactions may be issued (block 78). If a refill interval has been reached (decision block 80, yes leg), the rate limiter circuit 24A-24G/control circuit 40 may refill credits to the bucket based on the refill credits parameter (block 82). It is noted that the refill of credits may be independent of transactions (e.g., based on a timer or the like, refilling credits at a fixed rate per unit time).

In accordance with this disclosure, in one embodiment, a system may comprise: a plurality of agents and a communication fabric coupled to the plurality of agents. The plurality of agents may be configured to communicate on the communication fabric using one or more virtual channels. A subset of the plurality of agents may include rate limiter circuits that control transmission of communications by the subset of the plurality of agents in a first virtual channel of the one or more virtual channels. The rate limiter circuits may be programmable to specify a rate of transmission on the first virtual channel for corresponding agents of the subset, and the rate limiter circuits may be configured to modify the rate of transmission permitted by the rate limiter circuits based on an indication of whether or not at least a first agent of the plurality of agents is powered on. The first agent may use the first virtual channel. In an embodiment, the first agent may not include a rate limiter circuit. In an embodiment, the system may comprise a bridge circuit between the first agent and the communication fabric. The bridge circuit may also include a first rate limiter circuit. The first rate limiter circuit is configured to increase the rate of transmission permitted by the first rate limiter circuit based on the indication that the first agent is powered on. In an embodiment, the first rate limiter circuit may be configured to decrease the rate of transmission permitted by the first rate limiter circuit based on the indication that the first agent is powered off. In an embodiment, the rate limiter circuits in the subset of the plurality of agents may be configured to decrease the rate of transmission permitted by the rate limiter circuits based on the indication that the first agent is powered on. In an embodiment, rate limiter circuits in the subset of the plurality of agents may be configured to increase the rate of transmission permitted by the rate limiter circuits based on the indication that the first agent is powered off. In an embodiment, the first agent has an isochronous property for data transferred via the first virtual channel. In an embodiment, at least one of the plurality of agents is a memory controller. The memory controller may be configured to receive memory requests on the first virtual channel and provide memory data on the first virtual channel. The memory controller may comprise a first plurality of rate limiter circuits configured to generate a rate limit for the received memory requests based on a source agent of the received memory requests. In an embodiment, the memory controller may be configured to increase the rate limit for a given rate limiter circuit of the first plurality of rate limiter circuits that corresponds to the first agent based on the first agent being powered on. The memory controller may be, configured to decrease the rate limit for other ones of the first plurality of rate limiter circuits based on the first agent being powered on. In an embodiment, the memory controller may be configured to decrease the rate limit for a given rate limiter circuit of the first plurality of rate limiter circuits that corresponds to the first agent based on the first agent being powered off. The memory controller may be configured to increase the rate limit for other ones of the first plurality of rate limiter circuits based on the first agent being powered off. A corresponding method is also contemplated in an embodiment.

Computer System

Figure 5:
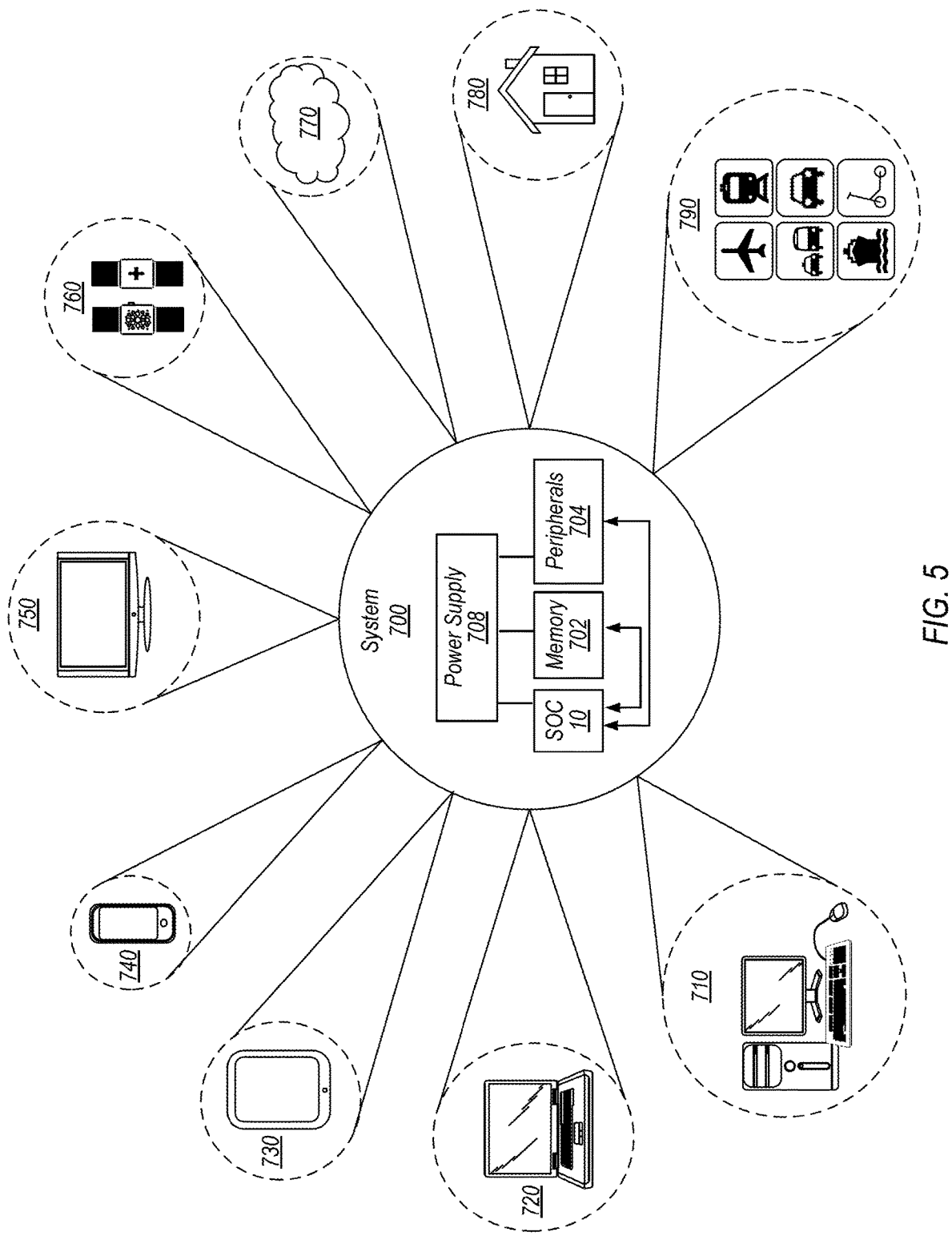
FIG. 5 is a block diagram of one embodiment of a system.

Turning next to FIG. 5, a block diagram of one embodiment of a system 700 is shown. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well). The memory 702 may include the memory 12 illustrated in FIG. 1, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 5 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 5 are illustrative only and are not intended to be limiting. Other devices are possible and are contemplated.

Computer Readable Storage Medium

Turning now to FIG. 6, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 6 may store a database 804 representative of the SOC 10. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 1. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of agents;
a communication fabric coupled to the plurality of agents; wherein:
the plurality of agents are configured to communicate on the communication fabric using one or more virtual channels;
a subset of the plurality of agents include rate limiter circuits that control transmission of communications by the subset of the plurality of agents in a first virtual channel of the one or more virtual channels;
the rate limiter circuits are programmable to specify a rate of transmission on the first virtual channel for corresponding agents of the subset;
the rate limiter circuits are configured to modify the rate of transmission permitted by the rate limiter circuits for the corresponding agents based on an indication of whether or not at least a first agent of the plurality of agents is powered on; and
the first agent uses the first virtual channel.

2. The system as recited in claim 1 wherein the first agent excludes a rate limiter circuit.

3. The system as recited in claim 1 further comprising a bridge circuit between the first agent and the communication fabric, wherein the bridge circuit also includes a first rate limiter circuit, wherein the first rate limiter circuit is configured to increase the rate of transmission permitted by the first rate limiter circuit based on the indication that the first agent is powered on.

4. The system as recited in claim 3 wherein the first rate limiter circuit is configured to decrease the rate of transmission permitted by the first rate limiter circuit based on the indication that the first agent is powered off.

5. The system as recited in claim 1 wherein the rate limiter circuits in the subset of the plurality of agents are configured to decrease the rate of transmission permitted by the rate limiter circuits based on the indication that the first agent is powered on.

6. The system as recited in claim 5 wherein the rate limiter circuits in the subset of the plurality of agents are configured to increase the rate of transmission permitted by the rate limiter circuits based on the indication that the first agent is powered off.

7. The system as recited in claim 1 wherein the first agent has an isochronous property for data transferred via the first virtual channel.

8. The system as recited in claim 1 wherein at least one of the plurality of agents is a memory controller, and wherein the memory controller is configured to receive memory requests on the first virtual channel and provide memory data on the first virtual channel, and wherein the memory controller comprises a first plurality of rate limiter circuits configured to generate a rate limit for the received memory requests based on a source agent of the received memory requests.

9. The system as recited in claim 8 wherein the memory controller is configured to increase the rate limit for a given rate limiter circuit of the first plurality of rate limiter circuits that corresponds to the first agent based on the first agent being powered on, and wherein the memory controller is configured to decrease the rate limit for other ones of the first plurality of rate limiter circuits based on the first agent being powered on.

10. The system as recited in claim 8 wherein the memory controller is configured to decrease the rate limit for a given rate limiter circuit of the first plurality of rate limiter circuits that corresponds to the first agent based on the first agent being powered off, and wherein the memory controller is configured to increase the rate limit for other ones of the first plurality of rate limiter circuits based on the first agent being powered off.

11. A method comprising:
communicating, by a plurality of agents, on a communication fabric using one or more virtual channels, wherein a subset of the plurality of agents include rate limiter circuits that control transmission of communications by the subset of the plurality of agents in a first virtual channel of the one or more virtual channels, and wherein the rate limiter circuits are programmable to specify a rate of transmission on the first virtual channel for corresponding agents of the subset; and
modifying the rate of transmission permitted by the rate limiter circuits for the corresponding agents based on an indication of whether or not at least a first agent of the plurality of agents is powered on, wherein the first agent uses the first virtual channel.

12. The method as recited in claim 11 wherein the first agent excludes a rate limiter circuit.

13. The method as recited in claim 11 wherein a bridge circuit between the first agent and the communication fabric also includes a first rate limiter circuit, the method further comprising:
increasing, in the first rate limiter circuit, the rate of transmission permitted by the first rate limiter circuit based on the indication that the first agent is powered on; and
decreasing, by the rate limiter circuits in the subset of the plurality of agents, the rate of transmission permitted by the rate limiter circuits based on the indication that the first agent is powered on.

14. The method as recited in claim 13 further comprising:
decreasing the rate of transmission permitted by the first rate limiter circuit based on the indication that the first agent is powered off; and
increasing, by the rate limiter circuits in the subset of the plurality of agents, the rate of transmission permitted by the rate limiter circuits based on the indication that the first agent is powered off.

15. The method as recited in claim 11 wherein the first agent has an isochronous property for data transferred via the first virtual channel.

16. The method as recited in claim 11 wherein at least one of the plurality of agents is a memory controller, and the method further comprises:
receiving memory requests on the first virtual channel and provide memory data on the first virtual channel by the memory controller, wherein the memory controller comprises a first plurality of rate limiter circuits; and
generating a rate limit for the received memory requests based on a source agent of the received memory requests.

17. The method as recited in claim 16 further comprising:
increasing, by the memory controller, the rate limit for a given rate limiter circuit of the first plurality of rate limiter circuits that corresponds to the first agent based on the first agent being powered on; and
decreasing, by the memory controller, the rate limit for other ones of the first plurality of rate limiter circuits based on the first agent being powered on.

18. The method as recited in claim 16 further comprising:
decreasing, by the memory controller, the rate limit for a given rate limiter circuit of the first plurality of rate limiter circuits that corresponds to the first agent based on the first agent being powered off; and
increasing, by the memory controller, the rate limit for other ones of the first plurality of rate limiter circuits based on the first agent being powered off.

19. A rate limiter circuit comprising:
a plurality of parameter registers programmable with a plurality of parameters that control a rate at which a corresponding agent in a system is permitted to transmit communications on a first virtual channel on a communication fabric; and
a control circuit coupled to the plurality of parameter registers, wherein:
the control circuit is configured to apply a first rate limit to the corresponding agent based on the plurality of parameters and an indication that at least a first agent different from the corresponding agent is powered on,
the control circuit is configured to a second rate limit based on the plurality of parameters and an indication that at least the first agent is powered off,
the first rate limit is different from the second rate limit, and
the first agent uses the first virtual channel.

20. The rate limiter circuit as recited in claim 19 wherein the first rate limit is lower than the second rate limit.

* * * * *